US011150995B1

United States Patent
Dhoolam et al.

(10) Patent No.: US 11,150,995 B1
(45) Date of Patent: Oct. 19, 2021

(54) NODE PLACEMENT FOR REPLICATION GROUPS

(71) Applicant: Amazon Technologies, Inc., Seattle, WA (US)

(72) Inventors: Surya Prakash Dhoolam, Seattle, WA (US); Haoyu Huang, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 691 days.

(21) Appl. No.: 15/264,479

(22) Filed: Sep. 13, 2016

(51) Int. Cl.
*G06F 16/00* (2019.01)
*G06F 11/14* (2006.01)
*G06F 16/901* (2019.01)
*G06F 16/9535* (2019.01)

(52) U.S. Cl.
CPC ...... *G06F 11/1451* (2013.01); *G06F 11/1464* (2013.01); *G06F 16/9024* (2019.01); *G06F 16/9535* (2019.01); *G06F 2201/84* (2013.01)

(58) Field of Classification Search
CPC ............. G06F 11/1451; G06F 11/1464; G06F 17/30867; G06F 17/30958; G06F 2201/84; G06F 17/30212; G06F 17/30578; G06F 17/30067; G06F 17/30094; G06F 17/30569; G06F 16/9024; G06F 16/9535
See application file for complete search history.

(56) References Cited

U.S. PATENT DOCUMENTS

| | | | |
|---|---|---|---|
| 5,909,540 A | 6/1999 | Carter et al. | |
| 7,039,773 B2 | 5/2006 | Hu et al. | |
| 8,301,600 B1 | 10/2012 | Helmick et al. | |
| 8,572,031 B2 | 10/2013 | Merriman et al. | |
| 8,732,517 B1 | 5/2014 | Stefani et al. | |
| 8,843,441 B1 | 9/2014 | Rath et al. | |
| 8,856,593 B2 | 10/2014 | Eckhardt et al. | |
| 8,868,514 B2 | 10/2014 | Lomet et al. | |
| 8,965,849 B1 | 2/2015 | Goo | |

(Continued)

OTHER PUBLICATIONS

"Ford-Fulkerson Algorithm," Wikipedia, The Free Encyclopedia, Aug. 9, 2016, <https://en.wikipedia.org/wiki/Ford%E2%80%93Fulkerson_algorithm> [Retrieved Aug. 29, 2016], 5 pages.

(Continued)

*Primary Examiner* — Ashish Thomas
*Assistant Examiner* — Suman Rajaputra
(74) *Attorney, Agent, or Firm* — Davis Wright Tremaine LLP

(57) ABSTRACT

Data replication groups may be used to store data in a distributed computing environment. A data replication group may include a set of nodes executing a consensus protocol to maintain data durably. In order to increase efficiency and performance of the data replication group a placement system may be used to determine the placement of node of the data replication groups. The nodes may be executed by a set of host computer systems within a distributed computing environment. The placement system may determine the placement of the nodes within the set of host computer systems based at least in part on one or more constraints. A selection algorithm may be used to determine a set of node for a data replication group satisfying the one or more constraints.

20 Claims, 9 Drawing Sheets

(56) References Cited

U.S. PATENT DOCUMENTS

| | | | |
|---|---|---|---|
| 8,966,027 B1* | 2/2015 | Brandwine | G06F 9/45533 |
| | | | 709/221 |
| 9,047,331 B2 | 6/2015 | Rao et al. | |
| 9,223,843 B1 | 12/2015 | Madhavarapu et al. | |
| 9,230,000 B1 | 1/2016 | Hsieh et al. | |
| 9,317,576 B2 | 4/2016 | Merriman et al. | |
| 9,489,434 B1 | 11/2016 | Rath | |
| 9,552,242 B1 | 1/2017 | Leshinsky et al. | |
| 9,569,513 B1 | 2/2017 | Vig et al. | |
| 9,639,589 B1 | 5/2017 | Theimer et al. | |
| 9,805,108 B2 | 10/2017 | Merriman et al. | |
| 2004/0263152 A1* | 12/2004 | Ahrikencheikh | G01R 31/2801 |
| | | | 324/754.03 |
| 2005/0005200 A1 | 1/2005 | Matena et al. | |
| 2006/0020634 A1 | 1/2006 | Huras et al. | |
| 2006/0218204 A1 | 9/2006 | Ofer et al. | |
| 2007/0156842 A1 | 7/2007 | Vermeulen et al. | |
| 2009/0049240 A1 | 2/2009 | Oe et al. | |
| 2011/0307886 A1 | 12/2011 | Thanga et al. | |
| 2012/0011398 A1 | 1/2012 | Eckhardt et al. | |
| 2012/0117229 A1* | 5/2012 | Van Biljon | G06F 21/6218 |
| | | | 709/224 |
| 2012/0197868 A1 | 8/2012 | Fauser et al. | |
| 2013/0110774 A1 | 5/2013 | Shah et al. | |
| 2013/0290249 A1* | 10/2013 | Merriman | G06F 16/278 |
| | | | 707/610 |
| 2014/0032506 A1 | 1/2014 | Hoey et al. | |
| 2014/0136896 A1 | 5/2014 | Tak et al. | |
| 2014/0172944 A1 | 6/2014 | Newton et al. | |
| 2014/0214798 A1* | 7/2014 | Nica | G06F 16/24542 |
| | | | 707/718 |
| 2014/0337393 A1 | 11/2014 | Burchall et al. | |
| 2015/0169417 A1 | 6/2015 | Brandwine et al. | |
| 2015/0186229 A1 | 7/2015 | Bortnikov et al. | |
| 2015/0372389 A1 | 12/2015 | Chen et al. | |
| 2016/0147859 A1 | 5/2016 | Lee et al. | |
| 2016/0321385 A1* | 11/2016 | Chen | G06F 30/34 |
| 2017/0004317 A1 | 1/2017 | Bumbulis | |
| 2017/0013058 A1* | 1/2017 | Annamalai | H04L 67/1095 |
| 2017/0270176 A1 | 9/2017 | Horowitz et al. | |
| 2017/0366451 A1 | 12/2017 | Schreter | |
| 2017/0366619 A1 | 12/2017 | Schreter | |
| 2017/0371567 A1 | 12/2017 | Piduri | |

OTHER PUBLICATIONS

"Maximum flow problem," Wikipedia, The Free Encyclopedia, Aug. 22, 2016, <https://en.wikipedia.org/wiki/Maximum_flow_problem> [Retrieved Aug. 29, 2016], 11 pages.

Abadi, "Consistency Tradeoffs in Modern Distributed Database System Design," Computer 45(2):37-42, Feb. 2012.

Bernstein, "Rethinking Eventual Consistency," Proceedings of the 2013 ACM SIGMOD International Conference on Management of Data, Jun. 22-27, 2013, 5 pages.

Chandy et al., "Distributed Snapshots: Determining Global States of Distributed Systems," ACM Transactions on Computer Systems 3(1):63-75, Feb. 1985.

Chen et al., "Replication Group Pools for Fast Provisioning," U.S. Appl. No. 14/954,928, filed Nov. 30, 2015.

Decandia et al., "Dynamo: Amazon's Highly Available Key-value Store," ACM SIGOPS Operating Systems Review 41(6):205-220, Oct. 14, 2007.

Dwork et al., "Consensus in the presence of partial synchrony," Journal of the Association for Computer Machinery 35(2):288-323, Apr. 1, 1988.

Gilbert et al., "Brewer's Conjecture and the Feasibility of Consistent, Available, Partition-Tolerant Web Services," ACM SIGACT News 33(2):51-59, Jun. 1, 2002.

Gray et al., "Leases: An Efficient Fault-Tolerant Mechanism for Distributed File Cache Consistency," ACM SIGOPS Operating Systems Review 23(5):202-210, Dec. 3-6, 1989.

Lamport et al., "Cheap Paxos," International Conference on InDependable Systems and Networks, Jun. 28, 2004, 9 pages.

Lamport, "Paxos Made Simple," Microsoft Research, http://research.microsoft.com/en-us/um/people/lamport/pubs/paxos-simple.pdf [retrieved Aug. 22, 2016], 2001, 14 pages.

Letia et al., "CRDTs: Consistency without concurrency control," Rapport de recherche 6956, Jun. 2009, 13 pages.

Maccormick et al., "Niobe: A Practical Replication Protocol," Microsoft Research, https://www.microsoft.com/en-us/research/wp-content/uploads/2007/08/tr-2007-112.pdf [retrieved Aug. 22, 2016], 2007, 42 pages.

Peleg et al., "The Availability of Quorum Systems," Information and Computation 123(2):210-223, Dec. 1, 1995.

Trencseni et al., "PaxosLease: Diskless Paxos for Leases," Cornell University Library, http://arxiv.org/pdf/1209.4187.pdf [retrieved Aug. 22, 2016], 2012, 9 pages.

Wikipedia, "Paxos (computer science)," Wikipedia, the Free Encyclopedia, page last edited Jun. 5, 2017 [retrieved Jun. 6, 2017], https://en.wikipedia.org/w/index.php?title=Paxos_(computer_science)&oldid=783901344, 19 pages.

* cited by examiner

NODE PLACEMENT FOR REPLICATION GROUPS

BACKGROUND

Organizations invest in technologies that provide customers with access to computing resources. Such services provide access to computing and/or storage resources (e.g., storage devices providing either a block-level device interface or a web service interface) to customers or subscribers. Within multi-tier ecommerce systems, combinations of different types of resources may be allocated to customers and/or their applications, such as whole physical or virtual machines, CPUs, memory, network bandwidth, or I/O capacity. Block-level storage devices implemented by a storage service may be made accessible, for example, from one or more physical or virtual machines implemented by another service.

Computer systems that provide services to customers may employ various techniques to protect the computer systems from a number of service requests that could potentially overload the computer systems. Furthermore, these computer systems may also employ various techniques to preserve customer data and customer experience during periods when the computer systems are overloaded or even experiencing failures. In general, a computer system is considered to be in an "overloaded" state if it is not able to provide the expected quality of service for at least some portion of customer requests it receives. Common solutions applied by overloaded computer systems include denying service to customers. In addition to this "overloaded" scenario, computer systems may also experience failure, including critical failure, power failure, or network failure.

To protect customer data against failures, customer data is often replicated across different computer systems. However, creating consistent replicas of customer data across a plurality of computer systems requires additional resources and requires consensus on customer data across the plurality of computer systems. Additionally, there is increased cost and time required to provision computer systems to maintain replicas of customer data. While such systems may maintain the integrity of customer data and mitigate the risk of loss, there may be a reduction in customer experience and delay in customers obtaining their data.

BRIEF DESCRIPTION OF THE DRAWINGS

Various techniques will be described with reference to the drawings, in which.

DETAILED DESCRIPTION

Figure 1:
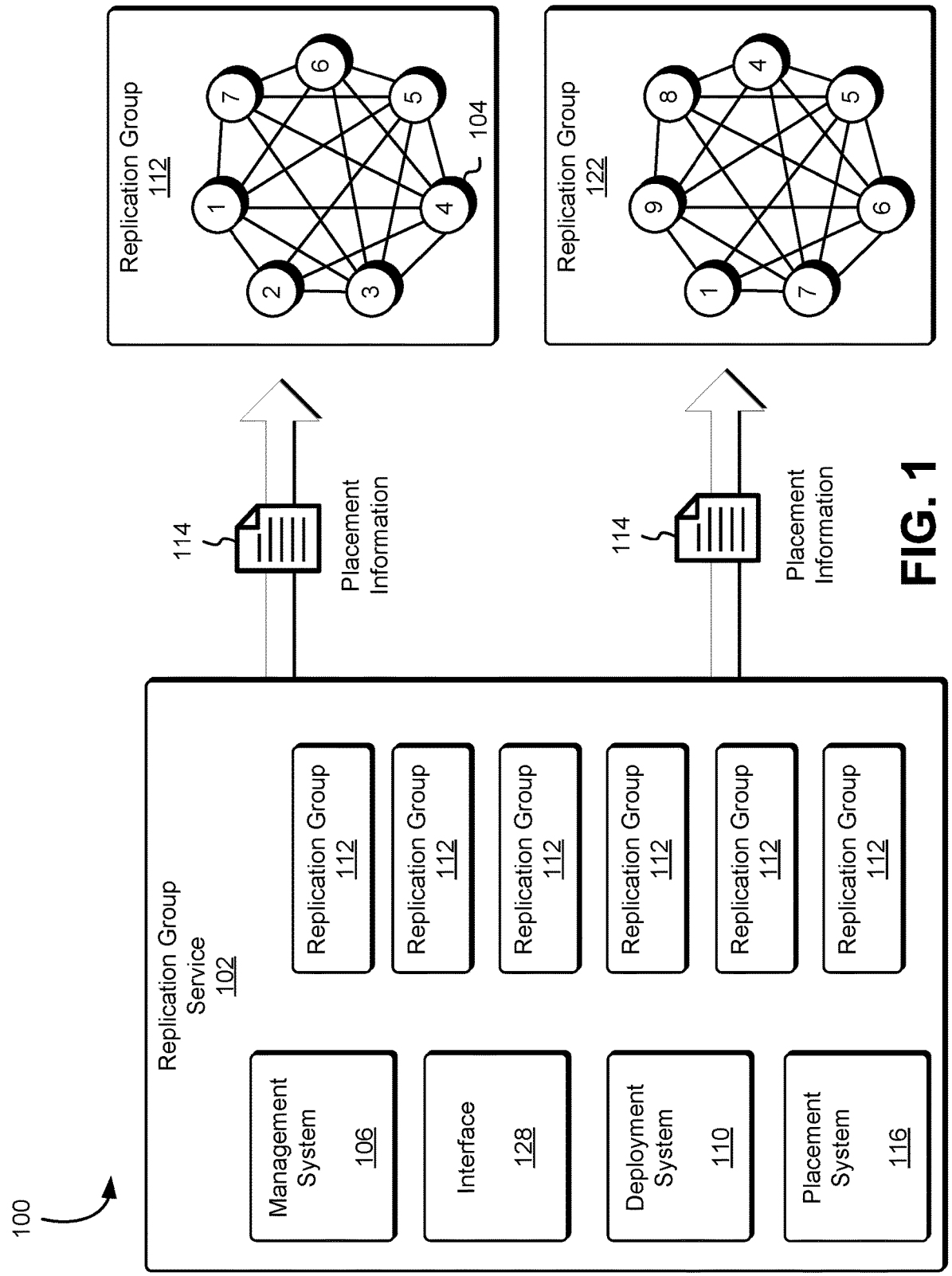
FIG. 1 illustrates an environment in which a placement system of a replication group service determines placement information for nodes of a data replication group in accordance with an embodiment.

In various examples described below, a placement service of a replication group service provides a list of nodes satisfying one or more placement constraints. The list of nodes may then be used to form a data replication group or be provided in response to a request for a data replication group. The one or more constraints, described in greater detail below, represent a placement strategy that may prevent loss or failure of a majority of nodes or data replication groups during certain operational events (e.g., hardware failure, software failure, software deployment, etc.). In addition, the one or more constraints may require one or more nodes of a data replication group to be closer or within a certain proximity to a computing resource supported by the data replication group. For example, the data replication group may be associated with a particular computer system or storage system and may maintain the current state of that system. The one or more constraints may require that a majority of the nodes of the data replication group are within the same locality (e.g., same rack, same brick, or same spine) as the system supported by the data replication group. The one or more constraints may include a number of hard constraints and a number of soft constraints. The hard constraints must be satisfied to obtain a placement solution while the placement solution may only satisfy a portion of the soft constraints.

The data replication group may consist of a number of nodes executed by one or more host computer systems, where the nodes implement a consensus protocol, such as Paxos, to enable consistent data replication between the nodes. As described above, the data replication group may be associated with a particular computer system or storage system and may maintain the current state of that system. Progression of the algorithm would therefore include receiving and recording updates to the current state of that system. In another example, the data replication group may be associated with a particular customer and may begin storing data on behalf of the customer; progressing the algorithm would therefore include receiving and recording data on behalf of the customer. The replication group service may receive request for a data replication group to support a particular computing resource or activity. In response, the replication group service may obtain a set of nodes from the placement service that satisfy the one or more constraints and select a number of nodes from the set of nodes to execute the data replication group. The data replication group may contain any number of nodes. Furthermore, the nodes may be executed by host computer systems, described in greater detail below, and may be part of a plurality of data replication groups. For example, a single node has the capacity to be a member of five data replication groups.

The placement system may obtain configuration information or other information indicating the number of nodes, location of nodes, capacity of node, and other information associated with the nodes in a computing resource service provider environment. When the placement service receives a request for a set of nodes, the request may indicate customer identification information, existing nodes of a data replication group (e.g., if the request is a request to repair a particular data replication group), one or more constraints, one or more constraints to ignore, particular nodes to ignore (e.g., a black list of nodes), location information for the computer system to be supported by the data replication group, or other information suitable for selecting nodes of a data replication group. In response to the request, the placement system may filter out and prioritize nodes, host computer systems, deployment groups, or other logical or physical organization of nodes. The placement service may then execute a selection algorithm to determine the set of nodes satisfying the one or more constraints and other requirements of the data replication group. If no nodes or an insufficient number of nodes satisfy the requirement, the placement service may transmit a notification of insufficient capacity.

In the preceding and following description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

FIG. 1 illustrates an environment 100 in which a computing resource service provider may operate a replication group service 102 configured to manage one or more data replication groups. The nodes 104 of the data replication group 112 may store copies or replicas of data so as to provide redundancy in the event of the loss of some number of nodes 104. The replication group service 102 may be configured as a clustered storage system for storing customer data, metadata about customer data, or other data across a plurality of physical hosts. Such a clustered storage configuration may reduce the risk of failure and increase availability of the data replication groups or particular nodes of the data replication groups during network connection events and/or network connection issues. For example, the number of nodes 104 of the data replication group 112 may be selected such that the probability of a majority of the nodes 104 of the data replication group 112 failing is below some threshold. This may be accomplished by a placement system 116 of the replication group service 102 determining placement information 114 for the nodes 104 of the data replication groups.

The replication group service 102 may maintain a plurality of data replication groups; in turn, each data replication group 112 may consist of a plurality of nodes 104. Each node 104 may be executed by a physical host, described in greater detail below in connection with FIG. 6, and each node 104 may participate in a plurality of data replication groups. For example, as illustrated in FIG. 1, node one participates in both data replication group 112 and data replication group 122. The data replication groups may include replicated state machines or other storage systems configured to store data in a distributed computing environment. In addition, each node 104 may be assigned a particular color. In some embodiments, nodes 104 may only communicate with other node of the same color. Each color may be considered a logical grouping on nodes 104 used to reduce and mitigate the effect of an operating event. For example, by assigning a customer two data replication groups of two distinct colors in the event of a failure of the nodes of one color, the other data replication group in not affected.

In various embodiments, each node 104 is a process, executed by a host computer system or other computer system, described in greater detail below, which participates in one or more data replication groups. For example, for a particular data replication group implementing the Paxos consensus protocol, each node 104 of the data replication group 112 and/or data replication group 122 may implement one or more roles of the Paxos consensus protocol such as the role of acceptor, proposer, and/or learner. In addition, the Paxos consensus protocol executed by the nodes 104 may include a master node responsible for progressing the consensus protocol (e.g., transmitting proposals which may be accepted by the remaining nodes 104 of the data replication group 112). The master node may be a role assigned to a single node of the data replication group 112 and may be responsible for managing certain aspects of the Paxos consensus protocol. In this manner, the nodes 104 of the data replication group may be responsible for the durability of customer data or other data maintained by the data replication group 112. Data replication group 122 may provide the same functionality as data replication group 112 as described in connection with FIG. 1.

The Paxos consensus protocol may include a family of different protocols configured to solve consensus issues in a network of unreliable processors (e.g., computer systems and networks that are subject to possible failures). The Paxos consensus protocol ensures agreement on one result and/or one operation among a group of participants, for example, the nodes 104 of the data replication group 112. The Paxos consensus protocol may be used by the replication group service 102 and the data replication groups to implement state machine replication and/or data replication in a distributed computing environment, such as the environment 100 illustrated in FIG. 1. The Paxos consensus protocol may define the set of actions which may be performed by the nodes 104 of the data replication groups according to one or more predefined roles included in the Paxos consensus protocol: client, acceptor, proposer, learner, and master. In some embodiments, a single node of a particular data replication group may implement one or more roles at any given time. For example, a particular node may be a master, acceptor, and learner in accordance with the Paxos consensus protocol.

A client, which may include a computer system under the control of a customer of the computing resource service provider and/or application or other executable code executed by one or more other computer systems or services of the computing resource service provider, may issue requests to the data replication group 112 and/or replication group service 102 and wait for a response. For example, the client may include a customer transmitting a storage request to an interface 128 of the replication group service 102. The interface 128 may include a web-services front end or other computer system interface configured to receive an application program interface (API) request and process the API request and/or direct the API request to an appropriate computer system or service for processing. In another example, the client may include another service of the computing resource service provider issuing a request to store state information of the other service on behalf of a customer. The interface 128 may also accept requests for other components of the replication group service 102, such as the management system 106, the placement system 116, or a deployment system 110. For example, the interface 128 may receive a request and/or command to update software executed by the nodes 104 or host computer server executing the nodes 104 and direct the request to the deployment system 110 described in greater detail below. In another example, the interface 128 may receive a request for leadership and/or placement information 114, described in greater detail below, from one or more nodes 104 of the replication group.

Returning to the example above, in accordance with the Paxos protocol, acceptors implemented by one or more nodes 104 of a data replication group 112 may be collected or assembled into groups, collectively referred to as quorums. In various embodiments, a quorum includes a majority of the nodes 104 of the data replication group 112. In various embodiments of the Paxos protocol, any message sent to an acceptor must be sent to the quorum of acceptors, and any message received from an acceptor is ignored unless a copy is received from each acceptor in the quorum. A proposer, when implemented by a node 104 of the data replication group 112, may transmit proposals to acceptors. A proposal may include a message attempting to reach an agreement on a value and/or action by the acceptors. A learner, when implemented by a node 104 of the data replication group 112, may perform some action once an agreement is reached (e.g., transmit a response to the client). Finally, a master, when implemented by a node 104 of the data replication group 112, may perform actions to advance the nodes 104 of the data replication group 112.

In general, any protocol that satisfies the consensus requirements of the replication group service 102 and data replication groups may be implemented in accordance with the embodiments described herein. Other examples of consensus protocols include Lockstep protocol, two-phase commit protocols, proof of work protocols, peer-to-peer network protocols, or Phase King Algorithm. Furthermore, in some embodiments, additional constraints may be placed on the consensus protocol implemented by the replication group service 102 and data replication groups as required. For example, the replication group service 102 and data replication groups may require the implemented consensus protocol to allow for the addition of a new member and/or node 104 to the data replication group 112 at some point in time after the initialization of the data replication group 112.

Additionally, the number of nodes 104 in the data replication group 112 may vary depending on the latency and durability requirements of the customer, other services of the computer system, or replication group service 102. For example, the number of nodes 104 in the data replication group 112 may be reduced if a particular service and/or customer requires reduced latency and response time. In contrast, if a customer and/or service requires higher fault tolerance and data durability, the number of nodes 104 in the data replication group 112 may be increased. A management system 106 of the replication group service 102 may be responsible for determining the number of nodes 104 in a particular data replication group. The management system 106 may be a process or other application executed by a host computer system.

Furthermore, the management system 106 may be responsible for creation, termination, and assignment of the data replication groups. For example, the management system 106 may determine that a new data replication group is to be created and may communicate with one or more other services (not shown in FIG. 1 for simplicity) of the computing resource service provider in order to create the new data replication group. The process of creating new data replication groups is described in greater detail below. The management system 106 may also be responsible for assigning and/or associating a particular data replication group to a customer or deployment group. For example, the management system 106 may map a particular data replication group or address of the particular data replication group to a customer such that the particular data replication group may receive traffic from or on behalf of the customer. In another example, the management system 106 may determine a number of host computer systems included in one or more deployment groups to execute nodes 104 of the data replication group based at least in part on a set of nodes 104 provided by the placement system 116 in accordance with one or more constraints on node placement.

The placement system 116 may be a process or application executed by a host computer system. In addition, the placement system 116 may monitor and determine the placement of nodes 104 and data replication groups in a distributed computing environment as described in greater detail below in connection with FIG. 4. For example, the placement system 116 may attempt to determine a set of host computer systems to implement the nodes 104 such that a fault or error of a particular computing resource (e.g., router, server, power source, or top of rack switch) does not prevent a quorum of nodes 104 from communicating. In addition, the placement system 116 may attempt to place nodes within a certain distance or locality of the computer systems supported by the data replication group 112. For example, it may be advantageous to place the nodes 104 of the data replication group 112 on the same server or rack as a particular logical volume supported by the data replication group 112. The logical volume may store customer data and the data replication group 112 may store metadata associated with that logical volume, such as size, when the logical volume was created, or a master partition and slave partition associated with the logical volume etc. In such a placement scenario failure of the server or rack would result in a failure of both the particular logical volume and the data replication group 112.

The placement system 116 may monitor and store information indicating the location of various computing resources and nodes 104 (e.g., particular computing resources implementing the nodes 104) in the distributed computing environment. This information may enable the placement system to determine placement information 114 for the nodes 104 of the data replication groups. The placement information may indicate a set of nodes 104 and/or the location of nodes 104 that satisfy various placement constraints. The one or more constraints may include: the placement system 116 must return a certain number of nodes 104 (e.g., a request for the placement system 116 to return a set of nodes must include at least seven nodes), all nodes 104 in the set must belong to the same color, any one deployment group may not contain more than a certain number of nodes 104, a particular rack or other physical computing resource may not contain more than a certain number of nodes 104, all nodes 104 must be spread across a certain number of deployment groups, nodes 104 without sufficient capacity must not be included in the set of nodes, or any other constraint that may be required to ensure robustness, consistency, and progress of the nodes 104 of the data replication group 112. In addition to the one or more constraints, the placement system 116 may attempt to satisfy one or more soft constraints on the set of nodes 104. The one or more soft containers may include: the data replication group should be local with the computing resource supported (e.g., all the nodes 104 should be in the same brick, network, or data center as a particular logical volume supported by the data replication group), the color of the nodes 104 should be diverse for the customer associated with the data replication group 112, the placement system 116 should balance node 104 capacity (e.g., using a round-robin or other selection algorithm for assigning nodes 104 to data replication groups), nodes 104 should be spread across deployment groups, nodes 104 should be concentrated within a locality or, if space is not available for all the nodes in a single locality nodes outside the locality, should be concentrated, and any other constraint that may be required to ensure robustness, consistency, and progress on the nodes 104 of the data replication group 112.

In addition, creation of the data replication groups, nodes 104, and logical volumes supported by data replication group 112 may occur at different intervals of time. For example, the nodes 104 may be executed on physical hosts prior to assignment and/or inclusion in a particular data replication group. In such embodiments, the placement system 116 may be provided with a placement hint or other information indicating a potential or probable location of a computing resource (e.g., logical volume) a particular data replication group is to support. For example, a virtual machine service may indicate a locality (e.g., a particular server or rack) which will support a new virtual machine to be supported by a particular data replication group. In another example, a block-level storage service may provide the placement system 116 with a placement hint indicating the physical location of a storage device which will likely host a new logical volume. The placement system 116 may utilize the placement hint as an input to the selection algorithm to include nodes 104 that satisfy one or more constraints given the location indicated in the placement hint (e.g., a certain number of nodes with the same locality as indicated in the placement hint).

Based at least in part on the various constraints and soft constraints, the placement system 116 may generate placement information 114 that may cause at least a quorum of nodes 104 to be executed by the same host computer system as the computing resource supported by the data replication group 112. In this manner, the failure of a computing resource outside the host computer system may not prevent the data replication group 112 from operating. Furthermore, if the majority of the nodes 104 or the master node is unavailable, then the data replication group 112 is not able to operate properly, and progress of the Paxos consensus protocol cannot be made. Progress may include updating and/or storing additional information in the nodes 104. For example, the nodes 104 may store information indicating the location of volume partitions such as partitions in a master-slave volume pair. In such an example, progress of the Paxos consensus protocol requires that the nodes 104 may update and/or record modifications to the master-slave volume pair (e.g., movement of a volume from a first host computer system to a second host computer system).

In addition to the constraints, the placement system 116 may use one or more selection algorithms described in greater detail below to generate the set nodes. For example, the placement system 116 may use a backtracking search to search all available nodes which may be included in the data replication group 112. In various embodiments, the placement system 116 utilizes one or more modified maximum network flow algorithms to determine the set of nodes 104. Specifically, the placement system may generate a graph or similar representation of the configuration of nodes 104, host computer systems, and other computing resources in the computing resource service provider environment and use various algorithms to traverse the graph and determine a solution. For example, the placement service may draw a vertex for each rack and deployment group, a directed edge from each rack vertex to deployment group vertex with a capacity representing the number of nodes, and draw a source and a sink vertex. The graph representing the configuration of the host computer systems and configuration of the nodes 104 is described in greater detail below in connection with FIGS. 2 and 3. The placement system 116 may use a maximum network flow algorithm such as the Ford-Fulkerson algorithm to determine the set of nodes 104 that satisfy at least a portion of the one or more constraints.

The backtracking algorithm may also be used by the placement system 116 as the selection algorithm. The backtracking algorithm may group nodes by rack and deployment group similar to the modified Ford-Fulkerson algorithm described above. The placement system 116 may generate a table with 3 or fewer nodes in each row and column and ensure that the table includes at least 4 rows. During execution of the backtracking search the placement system 116 may incrementally build a set of nodes that satisfy the one or more constraints, and abandon each partial candidate (e.g., backtracks) as soon as the placement system 116 determines that particular node cannot possibly be completed to a valid solution. The backtracking algorithm may cause the placement system to generate a tree structure where each node represents potential solutions (e.g., a set of nodes that satisfies the one or more constraints) and traverse the search tree recursively, from the root down, in depth-first order. At each node of the tree (e.g., each possible solution) the placement system may evaluate the potential solution.

The deployment system 110 may be a process or other application executed by a host computer system. Furthermore, the deployment system 110 may be responsible for maintaining a plurality of deployment groups and distributing deployments to one or more host computer systems executing one or more nodes 104 of the data replication group 112. The nodes 104 of the data replication group 112 may be distributed across a plurality of host computer systems such that no one host computer system executes a quorum of the nodes 104 of a particular data replication group. Deployments may include any software deployment or other distribution of executable code configured to install and/or update software of a host computer system or other computer systems capable of executing the source code associated with the software. Software deployment may include all of the activities that make a software system available for use. The general deployment process may consist of several interrelated activities with possible transitions between them. These activities can occur at the software developer side, client side, or both. Various different deployments and deployment activities may be utilized in accordance with the present disclosure. The deployment system 110 may manage various deployment activities such as preparing a deployment for release to the host computer systems, installing and activating the executable content included in the deployment, version tracking, updating, uninstalling, and various other activities suitable for deploying software to hosts.

In various embodiments, the host computer systems may be initialized and configured to execute a certain number of nodes 104 of one or more data replication groups. These host computer systems may be available and idle until the replication group service 102 determines to utilize the resources of the host computer system. For example, when the replication group service 102 receives a request for a data replication group, the replication group service 102 or component thereof, such as the management system 106, may select host computer systems to implement nodes 104 of the data replication group 112 based at least in part on an evenness criteria described in greater detail below.

Figure 2:
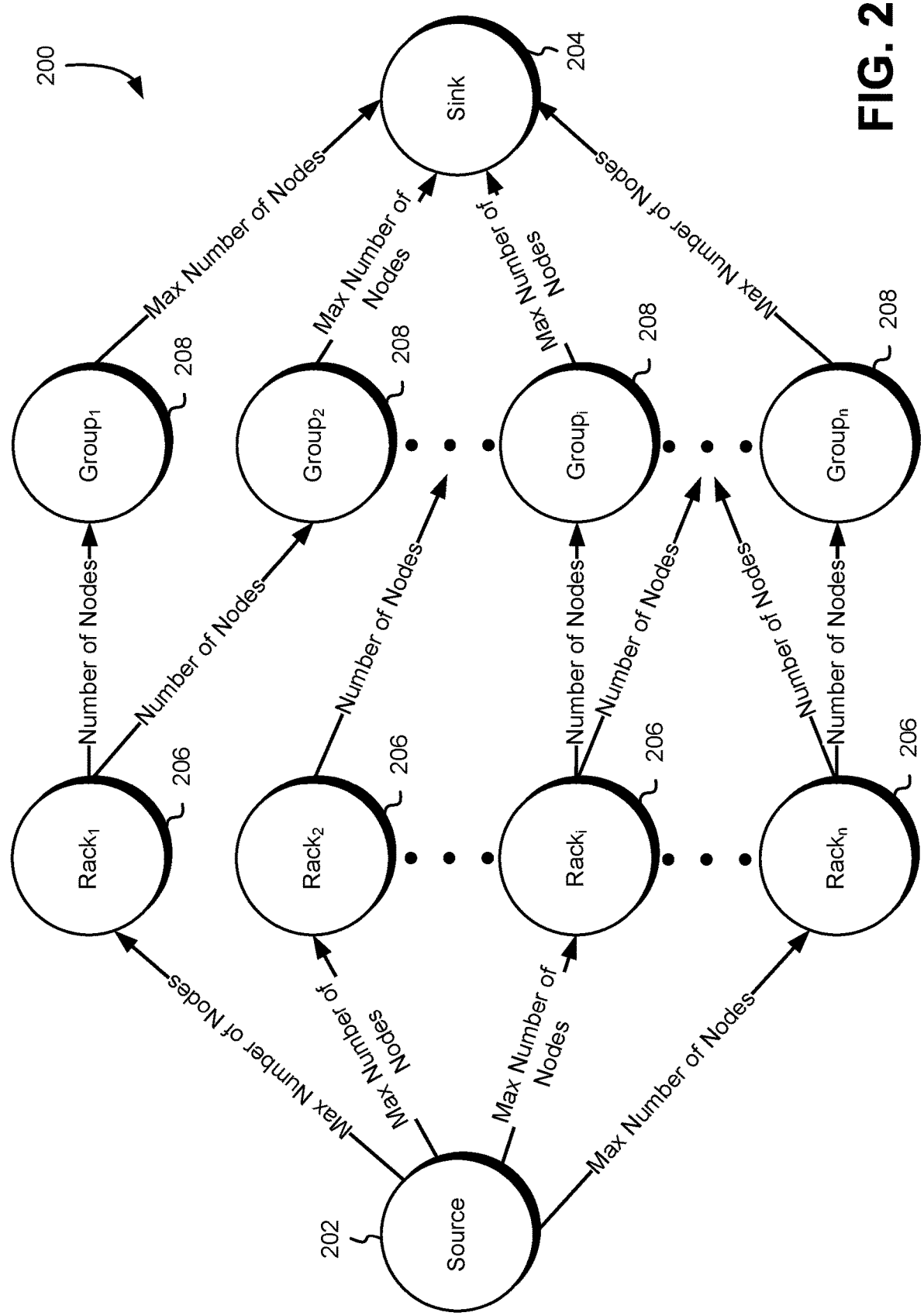
FIG. 2 illustrates an environment in which a placement system of a replication group service determines placement information for nodes of a data replication group in accordance with an embodiment.

FIG. 2 illustrates an environment 200 in which a placement system of a replication group service may use a selection algorithm to determine a set of nodes to include in a data replication group in accordance with an embodiment. As described above, a graph representing a configuration of the nodes may be generated by the placement system. As illustrated by FIG. 2, the vertices of the graph include rack information and deployment group information. Specifically, a vertex is generated for each rack 206 and each deployment group 208. Therefore, if there are 12 racks 206 and 10 deployment groups 208, the graph would include 12 vertices for the racks 206 and 10 vertices for the deployment groups 208 (illustrated in FIG. 2 as circles). In addition, the graph illustrated in FIG. 2 includes directed edges (shown as arrowed lines between vertices), the directed edges indicate the number of nodes that are executed by computing resources in the given rack 206 and are a member of the given deployment group 208.

As described in greater detail below, a rack may include a plurality of servers connected to a network through a top-of-rack switch or other networking device. The rack may include a plurality of computing resources which may be used to execute nodes as described herein. The deployment group may include a logical grouping on nodes and/or computing resources to which deployments are provided according to a deployment strategy. For example, in one deployment strategy, deployments (e.g., software deployments) may be sent to one deployment group at a time to reduce the impact of the deployment on the entire set of computing resources operated by the computing resource service provider. Therefore, by making the vertices of the graph racks and deployment groups, various constraints may be satisfied by maximizing a flow between a source 202 and a sink 204 of the graph illustrated in FIG. 2.

The source 202 represent an origin and/or starting point for the selection algorithm/maximum flow algorithm for determining the set of nodes. For example, the directed edge from the source 202 to the racks 206 represents the total number of nodes that may be placed in a single rack. Similarly, the directed edges between the deployment groups and the sink 204 may represent the total number of nodes that may be placed within a single deployment group. A search function may be used to search the graph for possible selection of nodes to include in the set of nodes that satisfy the requirements based at least in part on the graph. The search function may include a depth-first search or a breadth-first search.

The placement system may search for nodes that satisfy the constraints by at least including the constraints in the graph. For example, one constraint may require that there be no more than three nodes per rack and three nodes per deployment group. By setting the maximum flow between the source 202 and the racks 206 to three and the maximum flow from the rack 206 to the deployment group 208 to three, the placement system may ensure that a solution found using a maximum flow algorithm will only have three nodes per rack and three nodes per deployment group.

Figure 3:
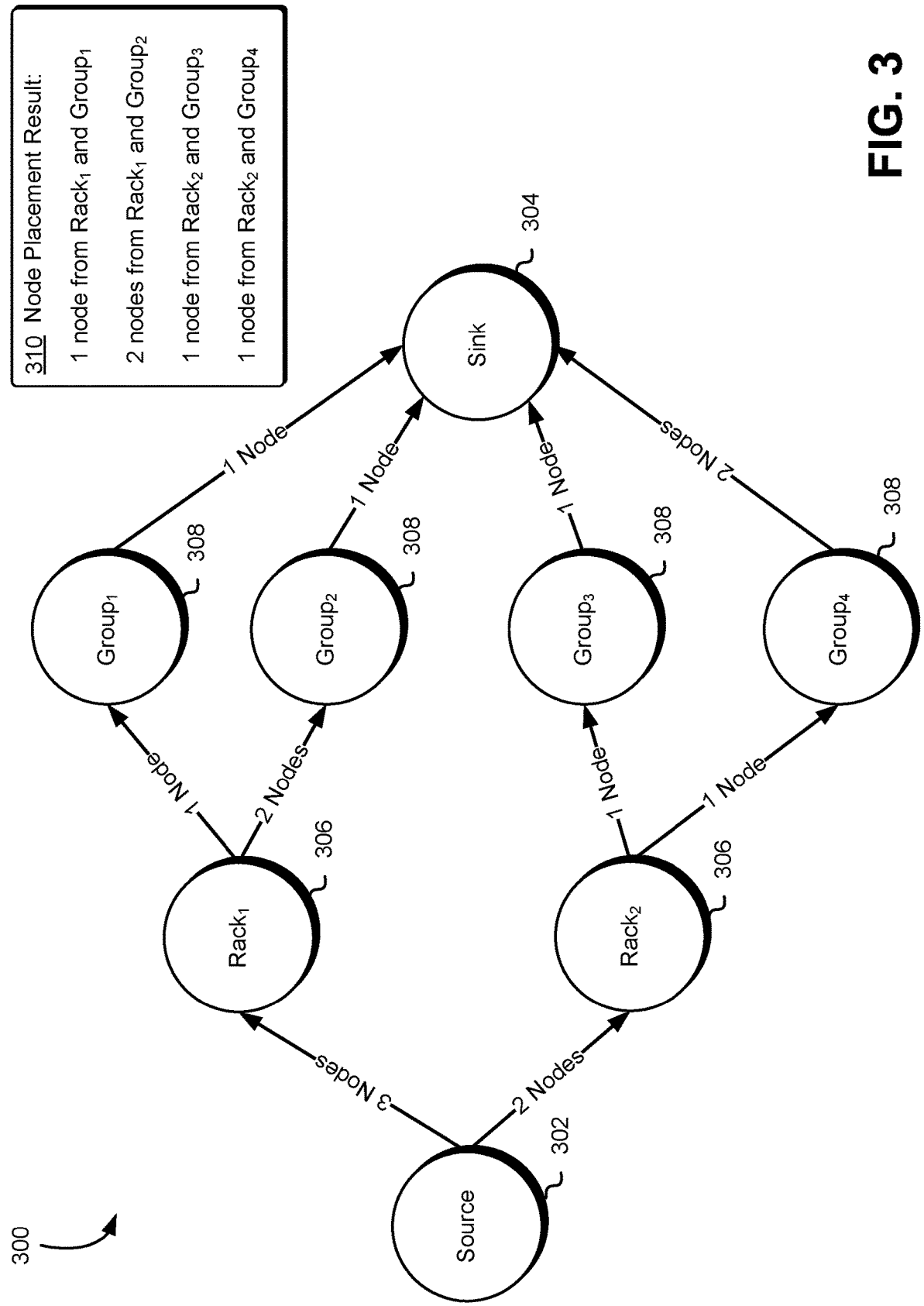
FIG. 3 illustrates an environment in which a placement system of a replication group service determines placement information for nodes of a data replication group in accordance with an embodiment.

FIG. 3 illustrates an environment 300 in which a placement system of a replication group service may use a selection algorithm to determine a set of nodes to include in a data replication group in accordance with an embodiment. Illustrated in FIG. 3 is a node placement result 310 determined based at least in part on the execution of a selection algorithm, for example, a modified Ford-Fulkerson algorithm. The modified Ford-Fulkerson algorithm is used to determine a maximum flow (e.g., a maximum number of nodes) between a source 302 and a sink 304. The graph illustrated in FIG. 3 may be defined as G(V,E), for each edge from u to v the capacity is defined as c(u,v) and the flow is defined as f (u,v). In various embodiments, when searching for a solution based at least in part on the graph, the flow along an edge cannot exceed the capacity along the edge. Furthermore, while there is a path p from the source 302 to the sink 304 in the graph such that $c_f(u,v) > 0$ for all edges $(u,v) \in p$ the algorithm may find $c_f(p)=\min \{c_f(u,v): (u,v) \in p\}$. As described above, the path can be found by performing a breadth-first search or a depth-first search in $G_f(V,E_f)$.

In the modified algorithm illustrated in FIG. 3, the capacity $c(R_i,G_i)$ is defined as the number of nodes executed by $R_i$ that are members of the deployment group $G_i$. Therefore, when the placement system or other system of the data replication group performs a search of the graph using the above algorithm, the results return a number of nodes distributed among various racks 306 and deployment groups 308 that satisfy various constraints. For example, as described above, by setting $c(S, R_i)=3$ where S is the source 302, the placement system may ensure that there are no more than three nodes per rack that are included in the set of nodes forming a data replication group (e.g., the set of nodes provided by the placement system in response to a request to create a new deployment group). Similarly, by setting $c(G_i, T)=3$ where T is the sink 304, the placement system may ensure that there are no more than three nodes per deployment group that are included in the set of nodes forming a data replication group.

As described above, the replication group service may receive a request for a new data replication group. In response to the request, the replication group service may request a set of nodes from the placement system. The placement system may determine a number of nodes to form the data replication group based at least in part on the node placement result 310. The node placement result 310, in various embodiments, is the result of performing a depth-first search of the graph as illustrated in FIGS. 2 and 3. As illustrated by FIG. 3, the result of the execution of the selection algorithm searching the graph for a solution (e.g., node placement result 310) includes 1 nodes from rack 1 and deployment group 1, 2 nodes from rack 2 and deployment group 2, 1 node from rack 2 and deployment group 3, and 1 node from rack 2 deployment group 4. Described in greater detail below, the various racks may be distributed across servers, networks, and data centers. Furthermore, the graph illustrated in FIG. 3 may be one of a plurality of solution/results returned by the placement system.

Figure 4:
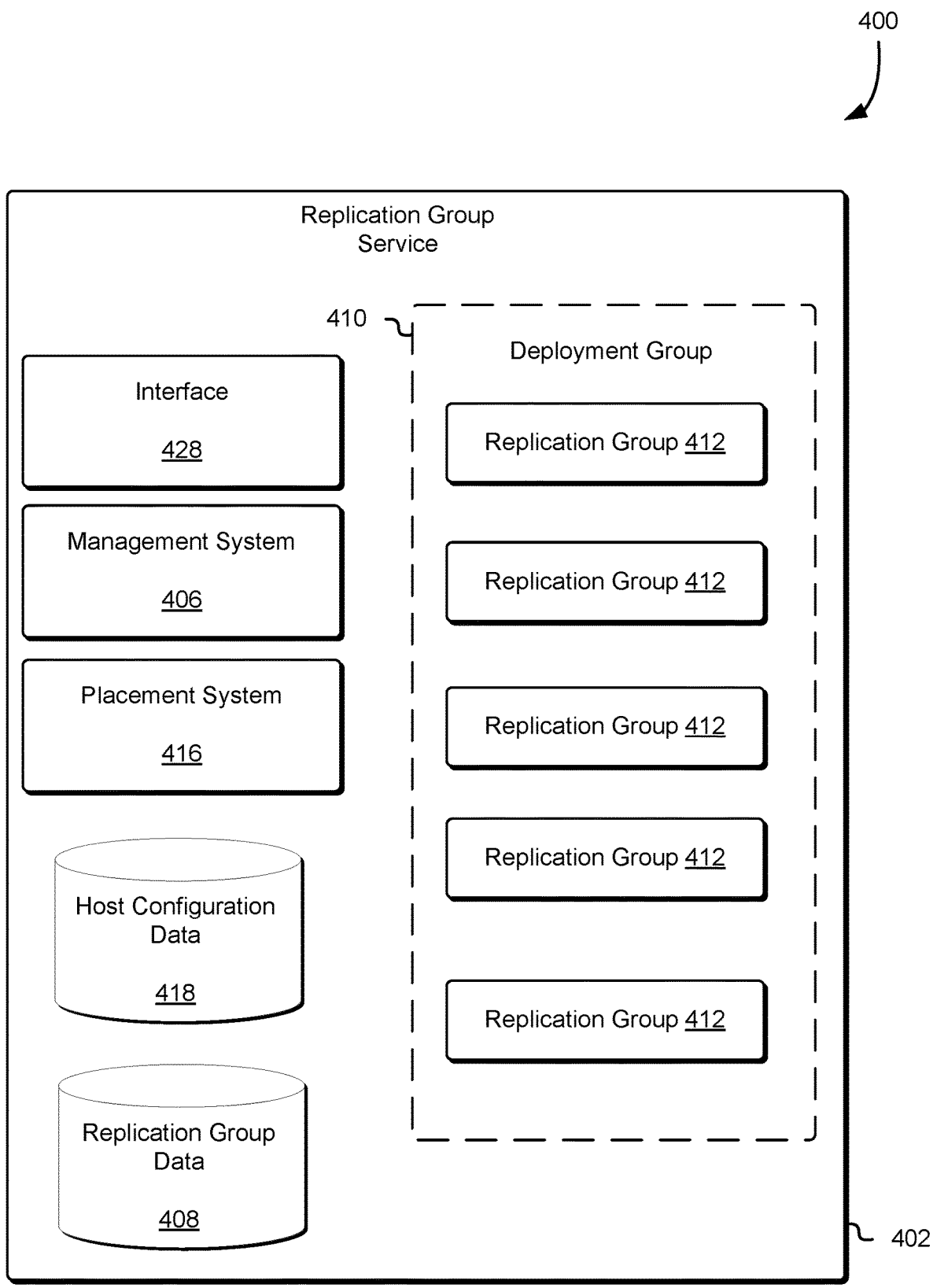
FIG. 4 illustrates an environment in which a replication group service maintains data replication groups in one or more deployment groups in accordance with an embodiment.

FIG. 4 illustrates an environment 400 in which a computing resource service provider may operate a replication group service 402 configured to manage one or more data replication groups 412 in a deployment group 410 of data replication groups 412. Provisioning a data replication group 412 such that it may implement a consensus protocol and begin to receive traffic may increase latency or violate the terms of a service-level agreement (SLA). An SLA may be part of a service contract or other agreement between a computing resource service provider and a customer where a particular service is formally defined.

Particular aspects of the service (e.g., scope, quality, responsibilities, latency, and availability) may be agreed on between the computing resource service provider and the customer. The deployment group 410 of data replication groups 412 may enable the computer resource service provider to achieve a predefined level of performance as indicated in a particular SLA. The deployment group 410 of data replication groups 412 may enable replication group service 402 to distribute deployments to data replication groups 412 without an interruption in service or degradation in service. In addition, the data replication groups 412 may be optimized such that a particular node of the data replication group 412 is assigned the role of master node to achieve a predefined level of performance as indicated in a particular SLA.

Furthermore, the replication group service 402 may include an interface 428, management system 406, and a placement system 416. In addition, the replication group service 402 may maintain replication group data 408 and host configuration data 418. Although all of the data replication groups 412 illustrated in FIG. 4 are members of the deployment groups 410, other configurations of data replication groups 412 and deployment groups 410 are within the scope of the present disclosure. For example, the replication group service 402 may maintain one or more data replication groups 412 outside of or aside from the deployment groups 410 of data replication groups 412. In another example, the replication group service may maintain a plurality of deployment groups 410. The deployment groups 410 may be distributed across regions, geographic boundaries, physical boundaries, fault zones, power zones, or other logical groupings of computing resources in a distributed computing environment. As described above, a number of nodes of the data replication group 412 that are members of the same deployment group may be limited by the placement system 416.

The replication group service 402 may further include replication group data 408. Replication group data 408 may consist of data corresponding to the data replication groups 412, nodes of the data replication groups, customers or services mapped to the data replication groups 412, and any such other data as required by the management system 406 and/or replication group service 402. The replication group data 408 may be maintained in a database of other data stores such that the data is accessible and/or queryable by other components of the replication group service 402, customer, or other services. In one example, replication group data 408 may maintain data to aid in discovery of nodes by one or more other nodes of the data replication groups 412. This data may include a mapping of data replication groups 412 to nodes. Furthermore, the data may include information about particular nodes and/or roles of the particular nodes. For example, an input/output (I/O) request may be received at the interface 428 of the replication group service 402. The I/O request may indicate a particular data replication group, the replication group service 402 or component thereof, and may query the replication group data 408 in order to determine a leader or other node of the data replication group 412 designated to receive the I/O request.

In various embodiments, the placement system 416 may determine replication group data 408 such as the location of nodes or the data replication groups 412 and the nodes' membership to one or more deployment groups 410. The data in the replication group data 408 may be updated at various intervals of time. For example, the management system 406 may query the nodes and/or data replication groups 412 in order to obtain information useable to update the replication group data 408. The replication group data 408 may also include information corresponding to the number of data replication groups 412 or nodes of the data replication groups 412 in the deployment group 410, a maximum number of data replication groups 412 or nodes to be included in the deployment group 410, and a frequency or number of requests for data replication groups 412 received by the replication group service 402. The replication group service 402 or component thereof may utilize this information to determine a rate at which data replication groups 412 are to be added to the deployment groups 410 and/or a rate at which new deployment groups are to be generated. The process for adding data replication groups 412 to the deployment groups 410 may include identifying, by the placement system, a set of physical hosts suitable for hosting a new data replication group, initializing nodes on the set of physical hosts to be included in the new data replication group, initializing a consensus protocol among the nodes, validating the health of the data replication group 412 (e.g., determining the status of heartbeat messages), and updating the replication group data 408 to indicate that the new data replication group is ready to receive traffic and is a member of the deployment group 410. A data replication group 412 may be considered healthy if a majority of the nodes of the data replication group 412 are operating as expected (e.g., have successfully validated the health of the node).

The replication group service 402 may further include host configuration data 418. The host configuration data 418 may consist of information indicating the location of various computing resources in a distributed computing environment, network topology, power topology, and any such other data as required by the placement system 416 and/or replication group service 402 to be used by the placement system to determine a set of nodes to include in the data replication groups 412. The replication group data 408 may be maintained in a database of other data stores such that the data is accessible and/or queryable by other components of the replication group service 402, customer or other services. In one example, the host configuration data 418 is maintained to enable the placement system 416 to determine suitable placement locations for nodes of the data replication groups 412 based at least in part on one or more constraints.

In various embodiments, when providing the data replication group 412 in response to a request, the data replication group may be selected based at least in part on a variety of factors, such as the health of the data replication group 412, the time at which the data replication group 412 was created, a position of the data replication group 412 in a queue, attributes of the data replication group 412 (e.g., number of nodes, physical hosts implementing the nodes, location, latency, processing power, failure rate, fitness of a master node, etc.), a consensus protocol executed by the data replication group 412, and other factors that are suitable for selecting a particular data replication group to fulfill the request. The selected data replication group 412 may then be associated with the new resource, customer, or other service responsible for submitting the request. At this point, the data replication group 412 may be ready to receive requests and store data.

Figure 5:
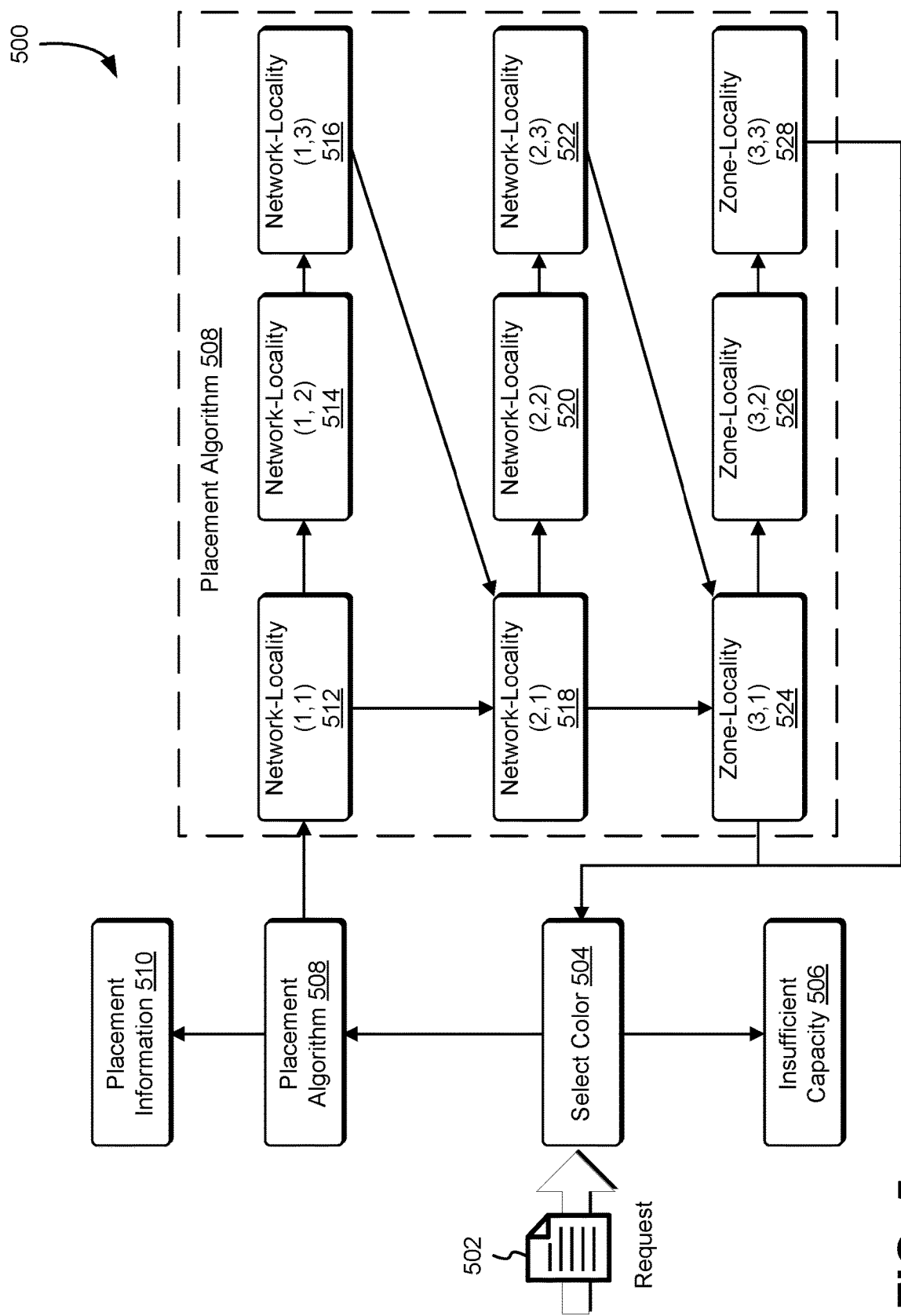
FIG. 5 illustrates an environment in which a placement system determines placement information for nodes of a data replication group in response to a request.

FIG. 5 illustrates an environment 500 in which in which an embodiment may be practiced. Specifically, FIG. 5 depicts receiving, at a placement system or other component of a replication group service, a request for placement information 510 (e.g., a set of nodes executed by one or more physical host to comprise or otherwise be included in a data replication group). The request 502 may include a customer request, a request from another service of a computing resource service provider responsible for providing the replication group service, or a request from a component of the data replication group service such as the management service described in greater detail above. The request 502 may be a request for a certain number of nodes to be used to create a new data replication group or repair or replace nodes of an existing data replication group. Once the placement system receives the request, the placement system may select a color 504 for the set of nodes to be included in the placement information 510 (e.g., nodes of the data replication group).

The color information may be a logical organization of the physical hosts and/or nodes executed by the physical host. The logical organization may reduce the impact of an operation event on the data replication groups. For example, by organizing physical hosts into separate colors and ensuring that the nodes of a data replication group are all of the same color, when a particular physical host fails or requires a restart it will not affect nodes associated with a different color. Similarly, by distributing computing resources provided to a particular customer among as many colors as possible, failure of a particular physical host associated with a color will not affect all of the computing resources provided to the customer. Returning to FIG. 5, the placement system may select a color 504 such that the color selected is diverse from at least one other color of a computing resource provided to a customer associated with the request 502. The placement system may include executable instructions or other code that cause the placement system to select the color 504 to satisfy various constraints as described above. If no color or no additional color (e.g., the placement algorithm provides no solution for a particular color) is available, the placement system may determine there is insufficient capacity 506. If the placement system determines there is insufficient capacity 506, an exception or other information indicating that there is insufficient capacity 506 may be returned in response to the request 502.

Once a color is selected, the placement system may execute a placement algorithm 508 to determine the placement information 510. The placement algorithm 508 may include executable instruction or other code that, when executed by one or more processors, implement a selection algorithm such as the modified Ford-Fulkerson algorithm as described above. For example, a graph may be generated with the vertices corresponding to racks in various locations (e.g., a brick or zone) and deployment groups associated with the nodes executed by one or more servers included in the racks. As illustrated by FIG. 5, the placement algorithm 508 may include a plurality of passes or determinations (illustrated in FIG. 5 as elements inside the dashed rectangle) used to obtain the placement information. For example, a first execution of the placement algorithm may be "network-locality (1,1)" 512, and network-locality (1,1) 512 may represent a capacity from a source vertex of the graph to one or more rack vertices included in the graph and a capacity from one or more deployment groups vertices to a sink vertex. As described above in connection with FIGS. 2 and 3, the representation of network-locality (1,1) 512 may be considered $c(S, R_i)=1$ and $c(G_i, T)=1$. By attempting to find a set of nodes that satisfy network-locality (1,1) 512 (e.g., a flow along the graph with capacity of one from source and to sink) the placement system may ensure that if a solution is found, the solution satisfies one or more constraints described above.

The placement algorithm 508 may attempt to find a solution that satisfies the one or more constraints by varying the capacity of the edge from the source and/or to the sink.

As illustrated in FIG. 5, the placement system may attempt to find a solution using the placement algorithm 508 under various conditions including network-locality (1,1) 512, network-locality (1,2) 514, network-locality (1,3) 516, network-locality (2,1) 518, network-locality (2,2) 520, network-locality (2,3) 522, zone-locality (3,1) 524, zone-locality (3,2) 526, and zone-locality (3,3) 528. Each condition represents a different capacity of the edges in the graph; for example, network-locality (2,3) 522 represents an edge of capacity 2 from the source to the rack and an edge capacity of 3 from the deployment groups to the sink. A network-locality or zone-locality may include an number of logical groupings of computing resources as described herein. For example, a locality may include a set of computing resources within the same network or the same distance to a network device (e.g., one network hop to a top of rack switch). In another example, a locality may include a set or collection of localities. For example, a locality may include all the computing resources in a data center which may be further divided into localities within the data center, such as servers or sets of servers within the data center.

Returning to FIG. 5, if less than the desired number of nodes are returned (e.g., the search of the graph returns less than the number of nodes required for the data replication group satisfying the constraints), then the placement algorithm may increase the capacity of one or more edges and search for another solution. For example, if after searching the condition network-locality (2,1) 518 less than seven nodes are returned, the placement algorithm may proceed to network-locality (2,1) 520 to search for seven nodes that satisfy the constraints. By increasing the capacity of the edge from the deployment groups to the sink, the placement algorithm 508 may find additional nodes that satisfy the constraints.

Alternatively, if less than the desire number of deployment groups are returned (e.g., the search of the graph returns nodes that are not distributed between a sufficient number of deployment groups), then the placement algorithm may increase the capacity of one or more edges and search for another solution. For example, if after searching the condition network-locality (2, 1) 518 the nodes are distributed between less than four deployment groups, the placement algorithm may proceed to zone-locality (3,1) 524 to search for a number of nodes that are distributed between four or more deployment groups. By increasing an edge capacity from the source to the racks, the placement algorithm 508 may find additional nodes that satisfy the constraints. The placement algorithm 508 may first attempt to find nodes within a brick (e.g., servers within the same rack or set of racks connected by a top of rack switch) and if an insufficient number of nodes are found may then attempt to find nodes within a zone. A zone, described in greater detail below, may include a logical grouping of servers or other computing resources.

Figure 6:
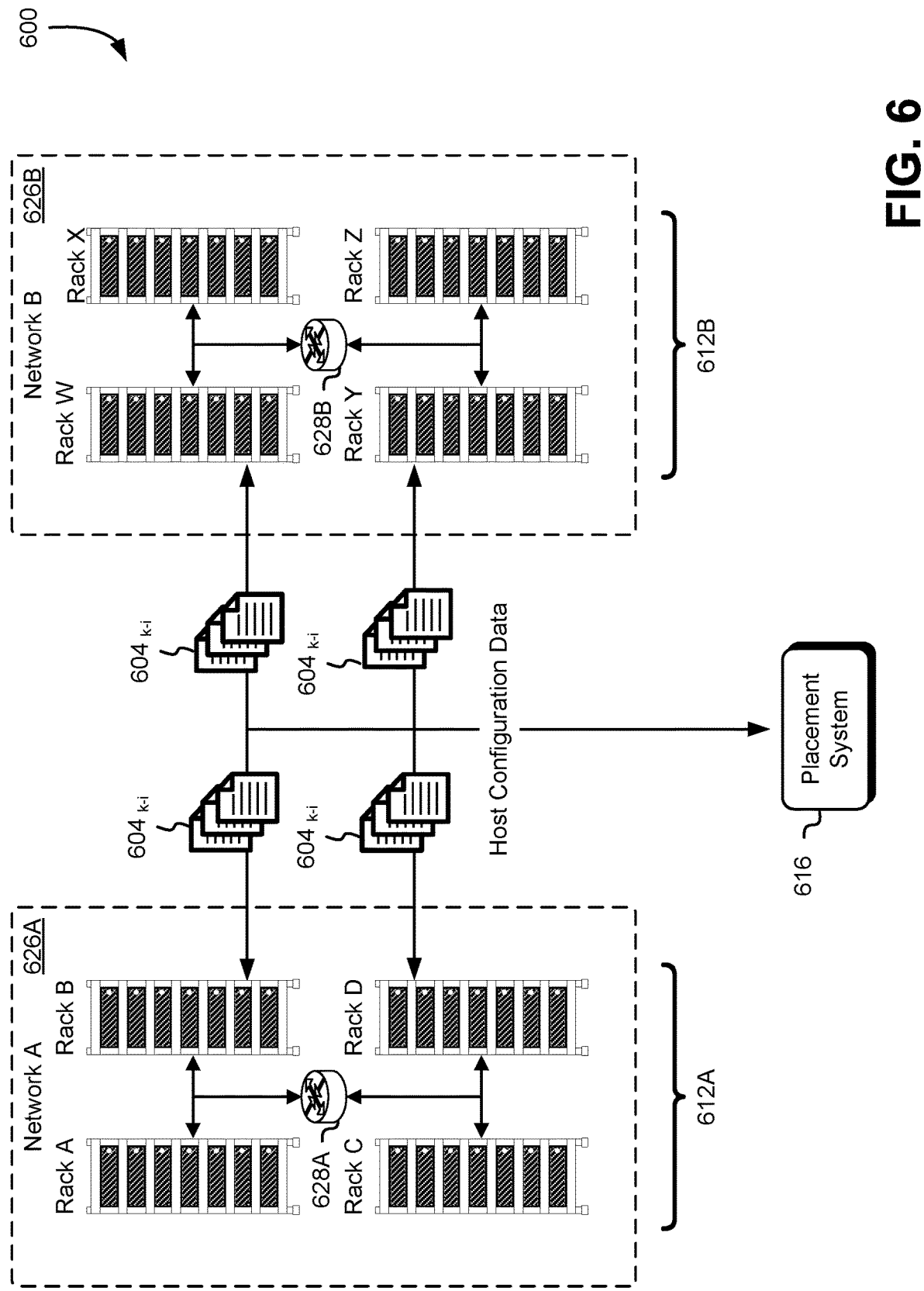
FIG. 6 illustrates an environment in which a placement system determines placement information based at least in part on a configuration of nodes within the environment in accordance with an embodiment.

FIG. 6 illustrates an aspect of an environment 600 in which an embodiment may be practiced. Specifically, FIG. 6 depicts the collection and processing of host configuration data 604 by a placement system 616 to enable the placement system 616 to generate graphs representing nodes executed by the servers in sets of racks 612A-612B and determine placement information based at least in part on the graphs. The environment 600 includes the placement system 616 that receives host configuration data 604 from servers or other components of the sets of racks 612A-612B. The nodes may be placed on the servers according to a rack diversity constraint, hard constraints, soft constraints, and other constraints, where the sets of racks 612 may be localized by different networks. The data collected by the placement system 616 may include various elements of the host configuration data $604_{k-i}$ obtained from different servers in the sets of racks 612A-612B. For example, the data collected by the placement system 610 may include the location of various master-slave partition pairs, the number of nodes executed by a particular server in the sets of racks 612A-612B, deployment groups associated with the nodes, capacity of the nodes, a color associated with the nodes, or other information suitable for making placement decisions and/or generating placement information.

The placement system 616 may be software or executable code executed by the servers in the sets of racks 612A-612B or other computing resources to obtain host configuration data $604_{k-i}$ generated by the servers in the sets of racks 612A-612B implementing nodes of the data replication groups as described above. The sets of racks 612A-612B may be physical hardware that hosts one or more servers or, in some embodiments, is simply a logical grouping of the one or more servers. Examples of logical groupings other than by rack may include servers grouped together based on data center location, servers in different fault isolation groups (i.e., logical divisions of resources such that failure of one fault zone may not affect servers in the other zones; e.g., grouped by geographic regions, data centers, hard drive clusters, backup generators, etc.), servers grouped together based on performance characteristics (e.g., throughput, input/output operations per second, etc.), and so on. The servers in a rack may be members of a particular network. In some implementations, multiple racks of servers may be members of the same network. For example, as illustrated in FIG. 6, the servers of the set of racks 612A share the network 626A. Likewise, the servers of the set of racks 612B share the network 626B.

The networks 626A-626B may be data communication pathways between one or more electronic devices. The networks 626A-626B may be wired or wireless networks and may use any of a variety of communications protocols for organizing their network traffic. The networks 626A-626B may allow the sharing of files, data, and other types of information between the one or more electronic devices accessible through the data communication pathways. Each of the networks 626A-626B may be associated with a router, such as an aggregation router that aggregates the servers of the respective set of racks into the common network, separate from the router associated with the other network. Each of the networks 626 A-626B may be on a different subnet than the other network. For example, as illustrated in FIG. 6, the servers of the set of racks 612A may be commonly connected to a router 628A. Similarly, the servers of the set of racks 612B may be commonly connected to a router 628B. The routers 628A-628B may be networking devices that forward packets between computer networks, such as between the networks 626A-626B.

As described above, the placement system 616 may obtain host configuration data $604_{k-i}$ and store the host configuration data $604_{k-i}$ for use in determining placement information. The placement system 616 may obtain the host configuration data $604_{k-i}$ directly from the servers and computing resources located in the environment 600 or may obtain the host configuration data $604_{k-i}$ computer systems and services responsible for managing the servers and computing resources located in the environment 600. For example, a placement service of a block-level storage service may place partitions of customer volumes on various servers of the set of racks 612A-612B, the placement system 616 may query the placement service of the block-level storage service to obtain host configuration information $604_{k-i}$ corresponding to the location of customer volumes on the various servers.

Furthermore, the placement system 616 may also include a data warehouse or data storage system that stores the host configuration data $604_{k-i}$ such that the host configuration information $604_{k-i}$ may be queried. In this manner, the placement system may be able to query the host configuration data $604_{k-i}$ for information as well as being provided information corresponding to the host configuration data $604_{k-i}$ through a data stream or other mechanism for providing the data to the placement system 616. The placement system 616 may include logic, such as software or other executable code, configured to determine, based at least in part on the host configuration data $604_{k-i}$, the placement of nodes of a data replication group that satisfies various soft constraints on locality. The soft constraints may include a set of rules that the placement system 616 will attempt to satisfy but will not provide an error if not satisfied. In addition, the locality of nodes may be determined relative to various different factors as described herein. For example, locality may be determined by network locality such as number of network hops between computing resources or being within the same network or subnetwork. In another example, locality may be determined by computing resources such as with the same rack of the set of racks 612A-612B or the same server. The placement system 616 may attempt to achieve locality and diversity by at least generating the placement information such that the number of soft constraints satisfied is maximized.

Figure 7:
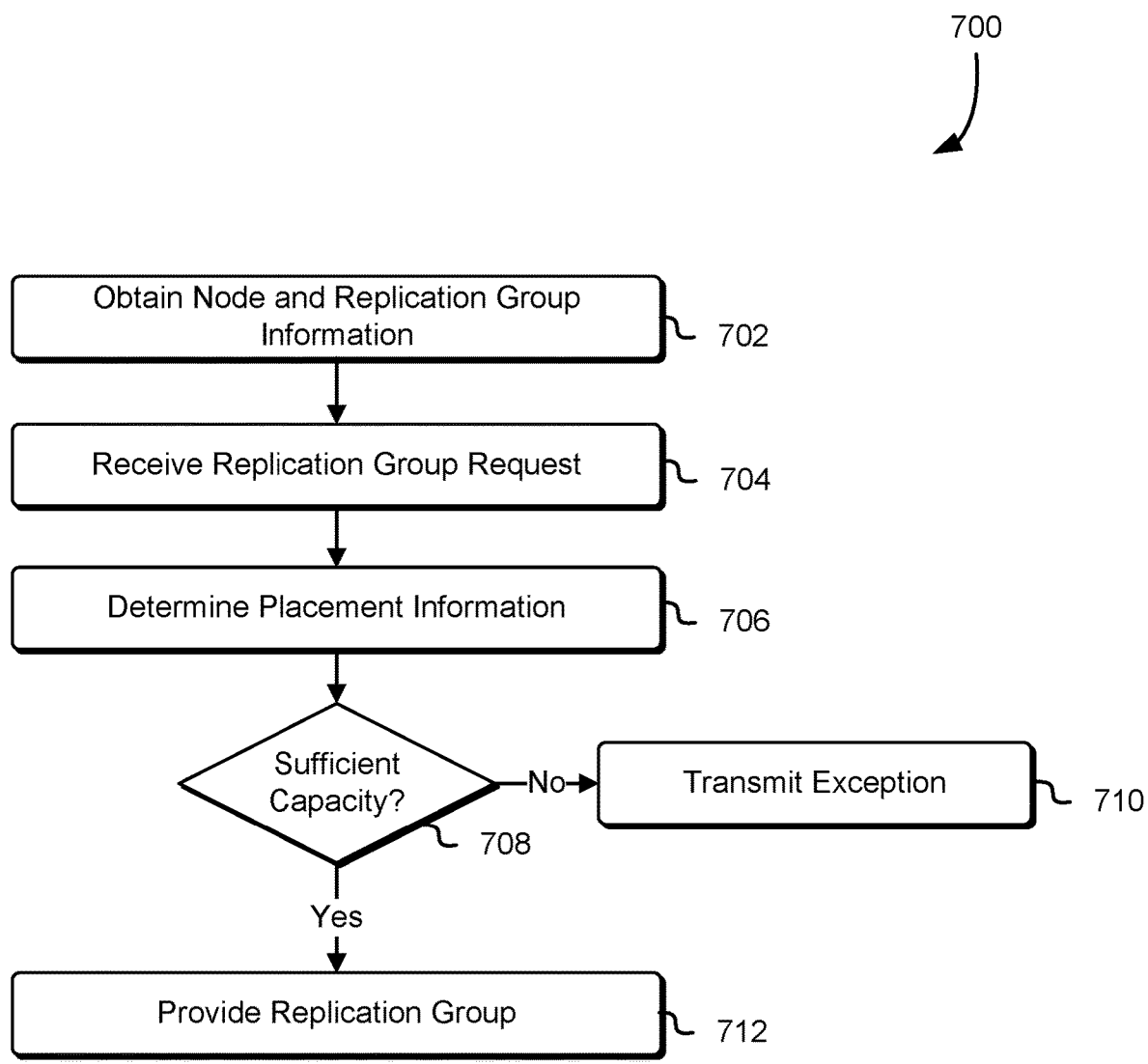
FIG. 7 shows an illustrative process which may be used to provide a data replication group in accordance with at least one embodiment.

FIG. 7 is a block diagram illustrating an example of a process 700 for provisioning a data replication group consisting of one or more nodes based at least in part on placement information in accordance with at least one embodiment. The process 700 may be performed by any suitable system such as a replication group service as described above in connection with FIG. 1. The process 700 includes obtaining node and data replication group information 702. For example, the system executing the process 700 may obtain host configuration information from one or more physical hosts as described above in connection with FIG. 6. The node and data replication group data may include a variety of information suitable for determining placement information according to one or more constraints. The node and data replication group data may be periodically or aperiodically obtained and may be stored in one or more data stores.

The system executing the process 700 may then receive a request for a data replication group 704. The request may indicate a number of nodes to be included or added to the data replication group and may indicate a customer associated with the data replication group. The request may be received at an interface and directed to the appropriate service or component of a service as described above. The system executing the process 700 may then determine placement information in response to the received request 706. The placement information may be determined based at least in part on a placement algorithm as described above. For example, a placement system may generate a graph based at least in part on the host configuration information and utilize the placement algorithm to search the graph for a solution satisfying the one or more constraints.

If, based at least in part on the placement information, there is sufficient capacity 708, the system executing the process 700 may provide the data replication group in response to the request 712. Providing the data replication group may include causing the set of nodes to implement a consensus protocol and including the set of nodes in a new data replication group. In addition, the placement information may indicate a set of nodes of which a subset may be used to create a new data replication group. Furthermore, sufficient capacity may be defined as the placement information including a number of nodes that satisfy the one or more constraints and that the number of node is sufficient to implement the data replication group. For example, if the data replication group requires seven nodes to have sufficient capacity, the number of nodes included in the placement information must be greater than or equal to seven. If there is insufficient capacity 708, the system executing the process 700 may transmit an exception 710. The exception may indicate that there is insufficient remaining capacity to generate new data replication groups. As a result, the data replication group service may provision new nodes or perform other operations to include capacity.

Figure 8:
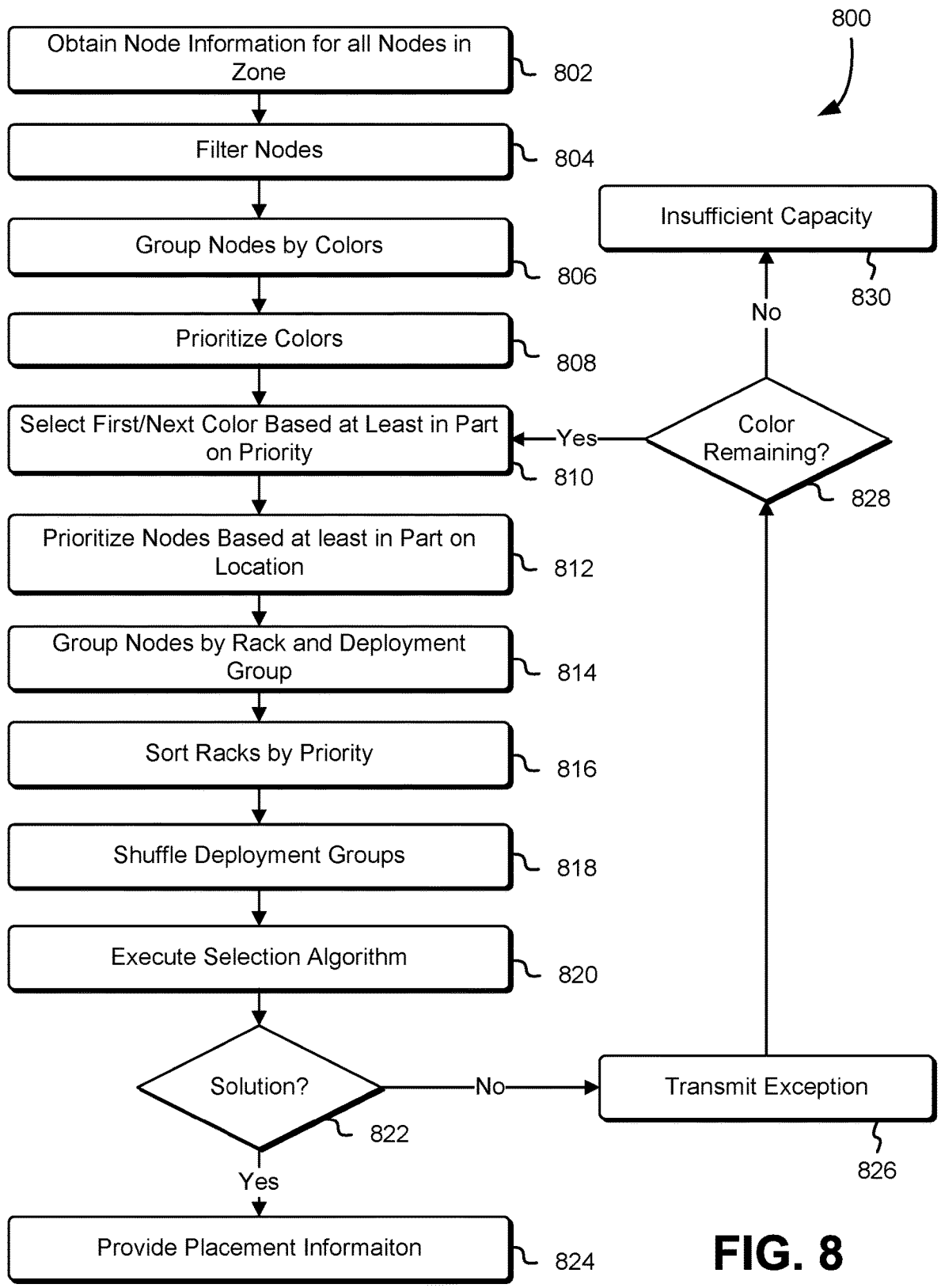
FIG. 8 shows an illustrative process which may be used to provide a data replication group based at least in part on a selection algorithm in accordance with at least one embodiment.

FIG. 8 is a block diagram illustrating an example of a process 800 for determining placement information based at least in part on a placement algorithm in accordance with at least one embodiment. The process 800 may be performed by any suitable system such as a replication group service or component thereof such as a placement system as described above in connection with FIG. 1. The process 800 includes obtaining node information for all the nodes in a particular zone 802. For example, the system executing the process 700 may obtain host configuration information from one or more physical hosts as described above in connection with FIG. 6. The node information includes a variety of information suitable for determining placement information according to one or more constraints. The node information may be obtained in response to a request or may be obtained periodically or aperiodically.

The placement system may then filter the nodes 804. Filtering the nodes may include removing from a set of nodes generated, based at least in part on the obtained node information, any nodes with insufficient remaining capacity, nodes outside of a given locality, nodes on a black list, or any other nodes that have one or more attributes that would render the node unsuitable for inclusion in a particular data replication group. The placement system may then group the node by colors 806. As described above, colors may be a logical association of nodes, and nodes may be limited to communication with other nodes of the same color.

The placement system may then prioritize the groups of nodes by color 808. For example, the colors may be prioritized by locality such that colors within a particular brick, rack, network, data center, etc., are prioritized. Prioritizing a color may cause the placement system to select a particular color and attempt to determine nodes associated with the particular color first to include in the placement information. In addition, color may be prioritized such that a customer associated with the data replication group has at least some diversity of colors as described above. The placement system may then select the first/next color based at least in part on the priority information 810. If two or more colors have the same priority, the color may be selected based at least in part on the color that may provide additional diversity of color for the customer.

Once the color is selected, the placement system may then prioritize nodes of the selected color based at least in part on locality 812. The locality may be determined based at least in part on a network location of the computing resource to be supported by the data replication group. For example, nodes within the same brick or rack as the computing resource may be given a priority of 1, nodes connected the same top of rack switch or nodes within the same network may be given a priority of 2, and nodes within the same data center may be given a priority of 3. The placement system may then group nodes by rack and deployment group 814. For example, as illustrated above in FIGS. 2 and 3, nodes may be organized based at least in part on the servers executing the nodes and a deployment group associated with the nodes.

The placement system may then sort racks based at least in part on the determined priority 816. For example, racks with a priority of 1 may be sorted such that the placement algorithm is executed on those racks first. Racks with the same priority may be sorted based at least in part on the remaining number of data replication groups the rack is capable of supporting (e.g., the amount of remaining capacity of the nodes executed by the rack). The placement system may then shuffle the deployment groups 818. The deployment groups may be shuffled randomly, pseudorandomly, or according to a predetermined pattern (e.g., round robin). Shuffling the deployment groups may distribute the nodes among a maximum number of deployment groups.

The placement system may then execute the selection algorithm 820. Executing the selection algorithm may include executing a search (e.g., deep-first search) of a graph generated based at least in part on the racks and deployment groups described above. The selection algorithm may return a number of nodes satisfying the one or more constraints based at least in part on a maximum flow of the graph. If a solution is determined 822, the placement system may provide placement information 824. The placement information may include a set of nodes determined based at least in part on the solution. If no solution is determined 822 (e.g., an insufficient number of nodes are returned by the selection algorithm), the placement system may then transmit an exception 826. The exception may indicate that the particular configuration of racks, deployment groups, and color does not have sufficient capacity to provide a deployment group that satisfies the one or more constraints. The placement system may then determine if additional colors remain 828. If addition colors remain, the next color may be selected based at least in part on priority 810 and the process may continue as described above. If no additional color remain, the placement system may then transmit a message indicating that insufficient capacity remains 830.

Figure 9:
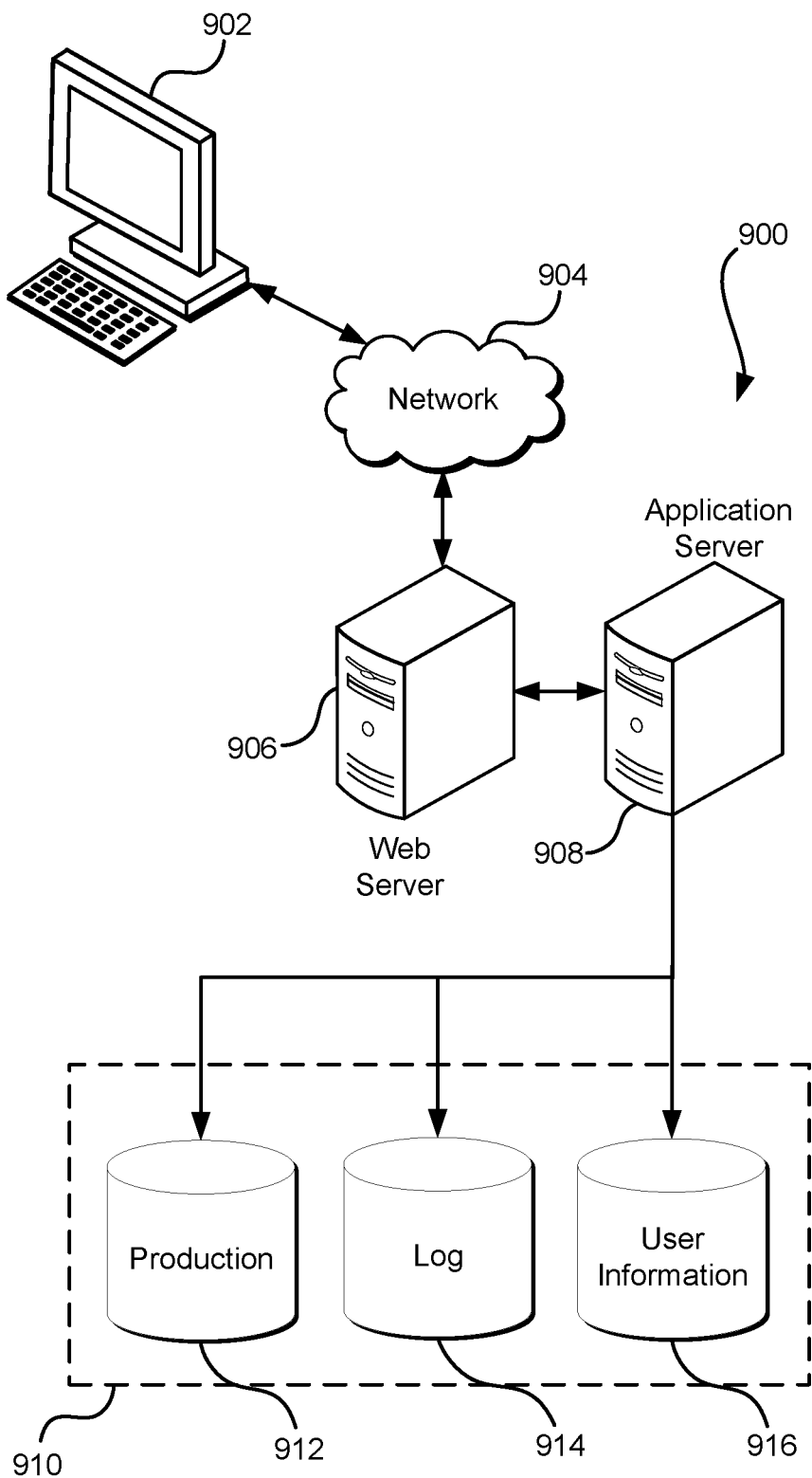
FIG. 9 illustrates an environment in which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages, or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network, or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly addressable communications network, as the environment includes a web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers, or other elements, processes, or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 902 and the application server 908, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 910 can include several separate data tables, databases, data documents, dynamic data storage schemes, and/or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis, or other such purposes. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update, or otherwise process data in response thereto. The application server 908 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python, or TCL, as well as combinations thereof. The server(s) may also include database servers, including without limitation those commercially available from Oracle®, Microsoft®, Sybase®, and IBM®, as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices, such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory, or other memory technology, Compact Disc Read-Only Memory ("CD-ROM"), digital versatile disk (DVD), or other optical storage, magnetic cassettes, magnetic tape, magnetic disk storage, or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    obtaining host configuration information for a set of computing systems in a distributed computing environment, the set of computing systems executing a plurality of nodes and at least a portion of the plurality of nodes implementing a consensus protocol as part of one or more data replication groups and to store replica data associated with the distributed computing environment;
    receiving a request for a new data replication group; and
    fulfilling the request by at least:
        generating a graph representing the host configuration information such that the graph includes a first set of vertices representing the set of computing systems in the distributed computing environment, a second set of vertices representing deployment groups associated with the plurality of nodes, a source vertex, and a sink vertex, the deployment groups comprising one or more of the computing systems executing one or more of the plurality of nodes, and the graph further including at least one or more constraints on a placement of a set of nodes to be included in the new data replication group;
        assigning a capacity to one or more edges of the graph based at least in part on the one or more constraints on the placement of the set of nodes to be included in the new data replication group;
        obtaining a result of a selection algorithm executed on the graph; and
        determining the set of nodes based at least in part on a placement algorithm including the one or more constraints and the result of the selection algorithm.

2. The computer-implemented method of claim 1, wherein fulfilling the request further comprises filtering the set of nodes based at least in part on capacities of nodes in the set of nodes to support the execution of the new data replication group.

3. The computer-implemented method of claim 1, wherein fulfilling the request further comprises filtering the set of nodes based at least in part on individual colors associated with respective nodes of the set of nodes, where nodes assigned to a particular color communicate only with other nodes assigned to the particular color.

4. The computer-implemented method of claim 1, wherein fulfilling the request further comprises:
   determining that the result of the selection algorithm fails to satisfy at least one constraint of the one or more constraints;
   modifying the capacity of the one or more edges of the graph;
   obtaining a second result of the selection algorithm executed on the graph including the modified capacity; and
   providing the second result in response to the request.

5. A system, comprising:
   one or more processors; and
   memory that includes instructions that, as a result of being executed by the one or more processors, cause the system to:
   receive a request for a set of nodes, the request indicating at least one or more constraints on executing the set of nodes by a set of computing resources in a distributed computing environment;
   determine a second set of nodes to store data executed by the set of computing resources;
assign a priority value to each node of the second set of nodes based at least in part on a locality of each node;
   determine a plurality of groups of nodes of the second set of nodes based at least in part on the set of computing resources executing the second set of nodes and one or more deployment groups associated with at least a subset of nodes of the second set of nodes, the one or more deployment groups comprising one or more of the computing resources executing at least the subset of nodes of the second set of nodes;
sort the plurality of groups based at least in part on the priority value;
   determine placement information by at least executing a selection algorithm on a first group of the plurality of groups of nodes, at least in part by generating a graph representation of the plurality of groups, where a set of vertices of the graph represents the set of computing resources executing the second set of nodes and the one or more deployment groups and a set of edges between the vertices represents a number of nodes of the first group of the second set of nodes, and the graph further including at least one or more constraints on a placement of nodes; and
   provide the placement information, the placement information usable to provision a data replication group.

6. The system of claim 5, wherein the memory further includes instructions that, as a result of being executed by the one or more processors, cause the system to obtain host configuration information associated with the set of computing resources in the distributed computing environment.

7. The system of claim 5, wherein the selection algorithm further comprises one algorithm of a set of maximum flow algorithms.

8. The system of claim 5, wherein the selection algorithm includes a modified Ford-Fulkerson algorithm executed on the graph.

9. The system of claim 5, wherein the selection algorithm includes a backtracking algorithm.

10. The system of claim 5, wherein the request for the set of nodes further comprises a request to replace at least one node of the data replication group.

11. The system of claim 5, wherein the locality of each node further comprises a location of a particular computing resource of the set of computing resources executing each node relative to a computing resource supported by the data replication group associated with the set of nodes.

12. The system of claim 5, wherein the memory further includes instructions that, as a result of being executed by the one or more processors, cause the system to provide the placement information such that the set of nodes is distributed across the set of computing resources such that no one computer resource executes a quorum of the set of nodes.

13. A non-transitory computer-readable storage medium having stored thereon executable instructions that, as a result of being executed by one or more processors of a computer system, cause the computer system to at least:
   cause one or more host computer systems to execute a set of nodes, each node of the set of nodes associated with a deployment group of a plurality of deployment groups and the set of nodes to store data of the one or more host computer systems, the plurality of deployment groups comprising one or more of the host computer systems;
   receive a request to modify node membership of a data replication group; and
   respond to the request by at least:
   executing a selection algorithm to determine a subset of nodes of the set of nodes satisfying one or more constraints on node placement, inputs to the selection algorithm including information associated with the one or more host computer systems, the set of nodes, and the plurality of deployment groups, the selection algorithm dependent on a graph representation of at least the plurality of deployment groups, the graph comprising at least one or more vertices representing one or more of the plurality of deployment groups, and the graph including the one or more constraints on the node placement; and providing information indicating the subset of nodes.

14. The non-transitory computer-readable storage medium of claim 13, wherein the instructions that cause the computer system to provide information indicating the subset of nodes further include instructions that cause the computer system to provide information indicating that a number of nodes included in the subset of nodes is insufficient to satisfy at least one constraint of the one or more constraints on node placement and as a result there is insufficient capacity to modify node membership of the data replication group.

15. The non-transitory computer-readable storage medium of claim 13, wherein the instructions that cause the computer system to execute the selection algorithm to determine the subset of nodes satisfying the one or more constraints on node placement further include instructions that cause the computer system to execute the selection algorithm such that at least one constraint of the one or more constraints on node placement indicates that no deployment group of the plurality of deployment groups can include more than a certain number of nodes of the subset of nodes.

16. The non-transitory computer-readable storage medium of claim 13, wherein the instructions that cause the computer system to execute the selection algorithm to determine the subset of nodes satisfying the one or more constraints on node placement further include instructions that cause the computer system to execute the selection algorithm such that at least one constraint of the one or more constraints on node placement indicates that no host computer systems of the one or more host computer systems can execute more than a certain number of nodes of the subset of nodes.

17. The non-transitory computer-readable storage medium of claim 13, wherein the instructions that cause the computer system to execute the selection algorithm to determine the subset of nodes satisfying the one or more constraints on node placement further include instructions that cause the computer system to execute the selection algorithm such that at least one constraint of the one or more constraints on node placement indicates that the subset of nodes must be distributed between a certain number of deployment groups of the plurality of deployment groups.

18. The non-transitory computer-readable storage medium of claim 13, wherein the instructions further comprise instructions that, as a result of being executed by the one or more processors, cause the computer system to:
   determine at least one node of the set of nodes has insufficient capacity; and
   remove the at least one node from the set of nodes.

19. The non-transitory computer-readable storage medium of claim 13, wherein the instructions that cause the computer system to execute the selection algorithm to determine the subset of nodes satisfying the one or more constraints on node placement further include instructions that cause the computer system to execute the selection algorithm such that at least one constraint of the one or more constraints on node placement indicates that a host computer system of the one or more host computer systems indicated in a placement hint executes at least one node of the subset of nodes.

20. The non-transitory computer-readable storage medium of claim 13, wherein the instructions that cause the computer system to execute the selection algorithm to determine the subset of nodes satisfying the one or more constraints on node placement further include instructions that cause the computer system to determine a first color associated with a second subset of nodes of the set of nodes previously assigned to a customer, and the one or more constraints on node placement further include selecting the subset of nodes such that the nodes of the subset of nodes are associated with a second color different from the first color.

* * * * *